Figure 1:
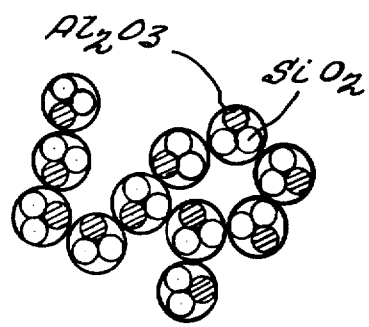

United States Patent [19]

Knorre et al.

[11] 4,051,228
[45] Sept. 27, 1977

[54] PREVENTING CAKING AND OBTAINING FLOWABILITY OF ALKALI CHLORIDES AND SALT MIXTURES THEREOF

[75] Inventors: Helmut Knorre, Seligenstadt; Joachim Fischer; Gerhard Pohl, both of Hanau, all of Germany

[73] Assignee: Deutsch Gold-und Silber-Scheideanstalt, Frankfurt, Germany

[21] Appl. No.: 579,158

[22] Filed: May 20, 1975

[30] Foreign Application Priority Data

Nov. 29, 1974 Germany .............................. 2456434

[51] Int. Cl.$^2$ .............................................. C01G 3/26
[52] U.S. Cl. ................................... 423/268; 423/267; 252/383
[58] Field of Search ................. 423/267, 268; 252/383

[56] References Cited

U.S. PATENT DOCUMENTS

| | | | |
|---|---|---|---|
| 3,009,775 | 11/1961 | Ladenburg | 423/268 |
| 3,036,884 | 5/1962 | Kaufman | 423/267 |
| 3,234,003 | 2/1966 | Sawyer et al. | 252/383 |
| 3,321,426 | 5/1967 | Dorsey | 252/383 |
| 3,490,744 | 1/1970 | Binsley | 252/383 |
| 3,686,145 | 8/1972 | Haschke et al. | 260/67 U |
| 3,873,337 | 3/1975 | Laufer et al. | 106/300 |

Primary Examiner—O. R. Vertiz
Assistant Examiner—Brian Hearn
Attorney, Agent, or Firm—Cushman, Darby & Cushman

[57] ABSTRACT

Caking of industrial alkali metal chlorides and mixtures containing them in storage is prevented and a flowable product is obtained by adding a hydrophilic and/or a hydrophobic material, in combination with a complex iron cyanide, on a hydroxyl group containing carrier to produce a permanent moisture content of at least 0.01 weight percent of water on the salt.

7 Claims, 4 Drawing Figures

PREVENTING CAKING AND OBTAINING FLOWABILITY OF ALKALI CHLORIDES AND SALT MIXTURES THEREOF

The invention is directed to a process for the prevention of caking together and for preserving the flowability of salts, specifically alkali chlorides, e.g. sodium chloride or potassium chloride, and alkali chloride containing industrial salt mixtures during storage. The invention also encompasses the anticaking salt compositions thus formed.

Economization and automization of industrial processes in an increasing measure require that the materials used thereby do not cake together, flow freely and be easily dosable. However, it is known that many inorganic salts in the form of finely divided crystallizates or granulates harden after a relatively short time in storage or also during transportation. This makes for considerable difficulty in the handling of the product. Already in emptying the silo in the production works there is increased operation expense and danger points on account of this tendency to harden designated generally as caking together. The salt must be disintegrated from the outside by a mechanical auxiliary apparatus and be brought into motion in order to be emptied or loaded. In removing of the salt mountain with a dredger because of the hardening, there frequently remain standing steep walls which reach to the peaks of the salt mountain and suddenly collapse and can fill up the dredger. Also in using the salt the dosing or mixing together with other substances is injured to a considerable extent by the caking together. Therefore there have not lacked attempts to find ways and means to reduce or entirely eliminate this tendency of salts to harden.

One of the best known processes consists of mixing in the dry form which salts having a tendency to harden, finely divided fillers, as for example silica, alkali, alkaline earth and aluminum silicates, aluminum oxide, magnesium oxide, calcium oxide or alkaline earth carbonate. These additives form a loose jacket around the individual salt crystals or granulate which is the recrystallization of the salt prevent a formation of bridges between the individual particles and therewith the caking together. The disadvantages of these frequently water insoluble additives are that they must be used in relatively large amounts in order to produce a suitable effect. Through these high additives the products are inclined to be powdery and also lose most of their clear solubility in water. Besides for mixing the additives with an anticake resistent finished salt, there is required very effective mixing apparatuses which as a rule are very expensive.

Frequently the hydrphobizing action of organic substances such as oils, glycerines, paraffins, paraffin oils, alkyl sulfonates or fatty amines is also sufficient for the anticaking finishing of salts. These additives for the most part have the disadvantage that they can only be placed on the salt with great industrial expense, for example as melts. A dosing of the hot salts, as it comes out of the production, by means of coco-fatty amines is practically impossible because of the odor troubles and danger to health associated therewith. It must be undertaken in a separate working step before the loading of the cold salt. In the interim storage of the salt therefore there is no protection before the caking together.

Besides it has long been known that the hardening of alkali chlorides can be reduced by an addition of complex iron cyanides. These products are also added in combination with agents for improving the freezing behavior of the salt. If the alkali chlorides are contaminated with other materials, above all alkaline earth compound, frequently the anticaking finishing with complex iron cyanides fails to work. Also additives which cause a precipitation or masking of the alkaline earth ions, in many cases bring about no improvement of the anti-caking properties of the salts by addition of complex iron cyanides.

The invention is based on the problem of developing a process for preventing the caking together in storage and obtaining a flowable industrial alkali chloride, e.g. sodium chloride, potassium chloride or alkali chloride containing industrial salt mixture, which process in an industrially simpler manner leads to an optimally flowable salt mixture while avoiding the above mentioned disadvantages.

This problem is solved according to the invention by adding a hydrophilic material and/or a hydrophobic material in combination with a complex iron cyanide on a hydroxyl group containing carrier to produce a permanent moisture content of at least 0.01 weight percent $H_2O$ on the salt.

This can be accomplished in the simplest manner by dosing the powdery anticaking agent with a metering trough to the salt stream flowing on the conveyer belt at a suitable place between the drier and silo in a suitable amount. In the turning, standing or plowing through of the salt stream as well as in flowing into the silo there occurs sufficient mixing of the powdery anticaking agent with the salt. In this way there can also be produced in large scale production units a good anticaking result without especial industrial expense.

Each of the constituents of the anticaking agent of the invention has its own special function. However only in the interplay of all components is the desired anticaking effect produced. The caking of the salts is known to depend upon the fact that on account of moisture absorption and evolution under changing climate conditions on the surface of the salt particles a recrystallization occurs in which the salt particles cake together. If the recrystallization is prevented, the salt also does not cake the salt together. According to the invention, by adding hydrophilizing and hydrophobizing materials the water content of the salt is regulated in such a way that under changing climate conditions there is always a fixed residual moisture of at least 0.01 weight percent $H_2O$ remaining on the salt. If a recrystallization of the salt should occur under extreme conditions, the addition of the complex iron cyanide guarantees that the crystallizing salt forms no solid bridges but only loose dendritic compounds. For these three components to be effective it is necessary that they be distributed homogeneously on the surface of the salt particles by simple means and without great industrial expense. This is obtained by the invention by adding the materials not directly but on carrier. This carrier is a water insoluble highly dispersed compound which permits itself to be well distributed in the salt and also remains held on the surface of the salt crystals under extreme conditions of moisture. Because of its hydroxyl groups it likewise contributes to regulating the moisture content of the salt. On the other hand it causes the complex iron cyanide to be localized at exactly the place and to remain held where the danger of growing together of the salt crystals is the greatest.

As hydrophilizing active components above all compounds of the polycarboxylate type have been found advantageous. Examples of such compounds are polyacrylates poly(alpha hydroxyacrylates), homo and copolymers of the maleic acid, e.g. styrene-maleic acid copolymer or other unsaturated di and polycarboxylic acid, for example itaconic acid or their corresponding salts, e.g. the sodium and potassium salts such as sodium polyacrylate for example. It is especially advantageous to use such polycarboxylates which contain as functional groups besides predominantly carboxyl or carboxylate groups additionally carboxyl and/or hydroxyl groups. The average degree of polymerization of the polycarboxylate, for short called POC, is between 5 and 500, preferably between 10 and 300, especially between 15 and 100. Processes for the production and building of the POC's are fully described in Haschke German Offenlegungsschrift No. 1,904,941 Haschke U.S. Pat. No. 3,686,145 and corresponding Haschke German Offenlegungsschrift No. 1,904,941, and Haschke U.S. Pat. No. 3,793,222 and corresponding Haschke German Offenlegungsschrift No. 1,942,556. The entire disclosures of the two U.S. Haschke patents and Haschke German Offenlegungsschrift No. 1,904,940 and hereby incorporated by reference and relied upon. As further examples of hydrophilizing active components there can also be used polyhydric alcohols such as glycerine or polyethylene glycols, e.g. tetraethylene glycol or polyethylene glycol 400. In the process of the invention the hydrophilizing agent is used in amount of 10 to 1000 ppm, preferably 50-300 ppm based on the anticaking stable equipped salt.

A POC of Type A used in the composition of the invention is characterized by the following data; A poly-(aldehydrocarboxylic acid) solution is prepared by oxidative copolymerization of 20 mol percent of acrylic acid with 80 mol percent of acrolein in aqueous 20 weight percent hydrogen peroxide at 70° C (11.1 mol of acrolein per mol of $H_2O_2$; feeding the monomer mixture to the stirred hydrogen peroxide within 4 hours). This solution was neutralized by adding 40 weight percent sodium hydroxide solution at 35° C after distillative separation of the greatest part of the residual monomers and the neutralized mixture subjected to the Cannizzaro reaction by further addition of NaOH up to pH 12. After neutralization of the alkaline reaction mixture with a residue of the above given poly(aldehydrocarboxylic acid) to pH 7 there was obtained a 35 weight percent aqueous solution of poly(hydroxycarboxylate) which is built of the following units of the general formula and is described by the following parameters.

Y + W/2 base mol percent units of the general formula:

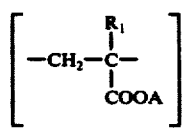

U-W base mol percent units of the general formula:

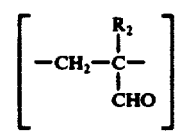

Z base mol percent units of the general formula:

W/2 base mol percent units of the general formula:

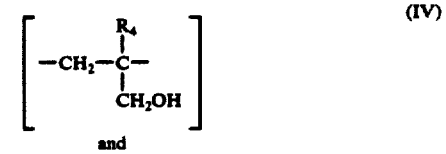

and

V base mol percent units of the general formula:

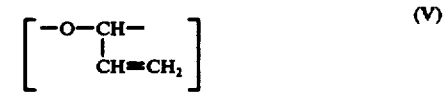

A stands for an alkali metal, e.g. sodium or potassium, hydrogen or the ammonium ion, $R_1$ stands for hydrogen, methyl, hydroxymethyl, ethyl, chlorine or bromine, preferably hydrogen or hydroxymethyl, $R_2$ and $R_4$ can be the same or different and are hydrogen or hydroxymethyl, $R_3$ and $R_5$ are likewise the same or different and are hydrogen, methyl or ethyl, preferably hydrogen, whereby as boundary conditions there must be fulfilled that W is greater than 0.3 U as well as for such polymers which contain an appreciable number of units of general Formula IV, the quotient of the ground mol percent carboxyl or carboxylate groups and ground mol percent of hydroxyl groups between 2 and 16, preferably between 2 and 9 especially between 3 and 8.

In POC, Type A, Y is 70 base mol percent, U is 17 base mol percent, V is 13 base mol percent, W is 16 base mol percent and Z is O base mol percent. The average degree of polymerization (viscosity average) is $\bar{P} = 20$. From this data there is obtained an equivalent weight of the POC Na salt of 109.0 (with consideration of the degree of neutralization of 0.88 as exists at a pH of 7 having regard to the analytically determinable end groups).

The other POC, Type B, used in the compositon of the invention is characterized by the following data. A poly(aldehydocarboxylic acid) solution was produced by oxidative copolymerization to 50 mol percent of acrylic acid with 50 mole percent of acrolein in aqueous 20 weight percent hydrogen peroxide at 70° C (1.1 mol of acroleic per mol of $H_2O_2$ feeding of the monomer mixture to the stirred hydrogen peroxide within 4 hours). This solution was neutralized by adding 45 weight percent sodium hydroxide solution at 35° C after distillative separation of the greatest part of the residual monomers and the neutralized mixture subjected to the Cannizzaro reaction by further addition of NaOH up to pH 12. After neutralization of the alkaline reaction mixture with a residue of the above given poly(aldehydocarboxylic acid) to pH 7 there was obtained a 36 weight percent aqueous solution of a poly (hydroxycarboxylates) which is described by the following parameters.

Y is 78 base mol percent.

U is 16 base mol percent.
V is 6 base mol percent.
W is 15 base mol percent.
Z is 0 base mol percent.

The average degree of polymerization (viscosity average) is $\bar{P} = 60$. From this data there is obtained an equivalent weight of the POC Na salt of 101.5 (with consideration of the degree of neutralization of 0.88 as exists at a pH of 7 having regard to the analytically determinable end groups). The same formula units for the letters Y, U, V, W and Z are valid as are described with Type A.

As hydrophobizing active components there can be used above all organosilicon compounds, polywaxes*, paraffin waxes** and higher saturated fatty acids, e.g. of 12 to 18 carbon atoms as for example stearic acid, lauric acid and palmitic acid and other long chain fatty acids. As organic silanes there may be especially mentioned propyltrialkoxy silane, e.g. propyl trimethoxy silane, propyl triethoxy silane and propyltributoxy silane, polypropyl siloxane and methylsiloxane. The oxies can also be hydrophobized in the manner shown in Laufer U.S. Pat. No. 3,873,337 the entire disclosure of which is hereby incorporated by reference and relied upon. Based on the anticaking stable equipped salt there is used 10–1000 ppm, preferably 50–300 ppm.

*(middle molecular weight 1500 to 5000; melting point ~90° to 105° C; C100 to C300)
**(middle molecular weight 370 to 460; softening temperature ~50° to 60° C; C24 to C31)

As complex iron cyanides there can be employed all commercial hexacyano ferrates of alkali and alkaline earth metals. Especially approved are sodium ferrocyanide, potassium ferrocyanide and calcium ferrocyanide. The complex cyanide is used in an amount of 10–1000 ppm, preferably 50–300 ppm based on the anticaking stable equipped salt.

As insoluble carriers there are especially suited inorganic finely divided materials with a secondary particle size between 0.1 and 150$\mu$, preferably 0.2 to 20$\mu$, which have hydroxyl groups or are able to form hydroxyl groups in the production of the anticaking agents.

It is especially advantageous to employ finely divided precipitated or pyrogenically obtain metal oxides and/or metalloid oxides, especially $SiO_2$ or $Al_2O_3$ in the form of individual oxides, mixed oxides, oxide mixtures or mixtures of oxides.

Figure 2:
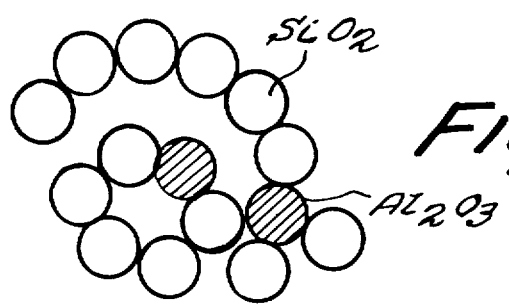
Figure 3:
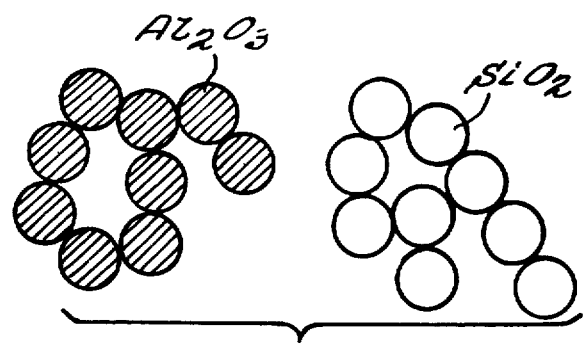
Figure 4:
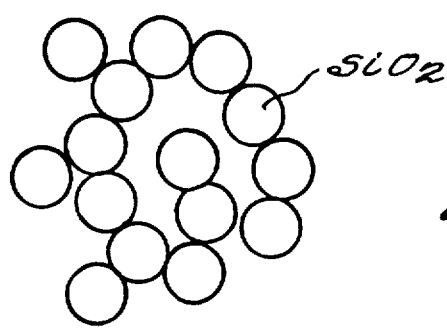

These four types of oxides are described more specifically in the drawings wherein:

FIG. 1 illustrates mixed oxides;
FIG. 2 illustrates oxide mixtures;
FIG. 3 illustrates mixtures of oxides, and
FIG. 4 illustrates individual oxides.

Referring more specifically to the drawings, FIG. 1 shows mixed oxides of $Al_2O_3$ in $SiO_2$. There is a building of foreign oxides into the primary particles. There are flocks of a so-called mixed oxide, for example $Al_2O_3$ on $SiO_2$. By agitating the particles in water there are formed stable sols in aqueous dispersion. The mixed oxides can be prepared according to Wagner Canadian Pat. No. 573,556 and Wagner U.S. Pat. No. 2,951,044. The mixed oxides are produced from a mixture of two volatile metal or metalloid halides using combustible gases and oxygen in a flame with water formation (hydrolytic decomposition). The two volatile halides come out of a single burner nozzle with reaction in the nozzle to form the mixed oxides. One production process. The entire disclosures of the Canadian and U.S. Wagner patents are hereby incorporated by reference and relied upon.

FIG. 2 shows oxide mixtures (or co-coagulates) of $SiO_2$ and $Al_2O_3$. There are flocks of separate primary particles, so-called co-coagulates (oxide mixtures), for example $SiO_2/Al_2O_3$. The oxide mixture (or co-coagulates) can be prepared according to Wagner German Pat. No. 1,066,552, Wagner U.S. Pat. No. 3,103,495 or Wagner U.S. Pat. No. 2,951,044, Col. 3, lines 33 et seq. Two volatile metal compounds, for example, $SiCl_4$ and $TiCl_4$ were reacted from two nozzles in (one or) two flames or flame chambers and jointly coagulated. Two volatile not mixed materials from two nozzles in a frame chamber. One production process. The entire disclosures of the Wagner German patent and both Wagner U.S. patents are hereby incorporated by reference and relied upon.

FIG. 3 shows mixtures of oxides specifically $Al_2O_3$ and $SiO_2$. There are several separate flocks. However, each flock consists of primary particles. Examples are $SiO_2$ and $Al_2O_3$ as thickening agents. The mixture of oxides can be produced according to Marsden U.S. Pat. No. 2,965,568. Thus the oxide mixture can be formed by mechanical mixing of two or more oxides recovered in separate processes pyrogenically or by precipitation or naturally. There are several methods of production and from these separate mixing processes. The entire disclosure of U.S. Pat. No. 2,965,568 is hereby incorporated by reference and relied upon.

FIG. 4 shows individual particles of an oxide specifically $SiO_2$. They are flocks of unitary primary particles (flocks = secondary particles), for example $SiO_2$ (Aerosil). The oxide is produced according to Bommer, German Auslegeschrift No. 1,150,955; Brunner German Auslegeschrift No. 1,163,784 and Brunner German Auslegeschrift No. 1,210,421. The unitary oxide is produced from a volatile metal or metalloid compound with combustible gases and oxygen in a flame with water formation (hydrolytic decomposition). The entire disclosures of the three German Auslegeschrifts are hereby incorporated by reference and relied upon.

There can be used not only inorganic oxides, but also other inorganic compounds such as alkali and/or alkaline earth and/or alumino silicates, e.g. sodium silicate, potassium silicate, magnesium silicate, calcium silicate, zeolite (a sodium aluminosilicate). These products have a specific BET surface area of about 50–500 m²/g, preferably 180–230 m²/g. The silanol group density is between 1 and 10 SiOH/100 A², preferably 3–6 SiOH/10-0A². The adsorbed moisture of the product is between 0.5 and 10 weight percent preferably between 3 and 6 weight percent. Carriers of this structure can absorb up to 40 weight percent of moisture without losing the appearance of a dry powder. In this form they are able to hold the active components bound in a kind of solid-dispersion. In order to be able to absorb the active components in this form the portion of the carrier material in the anticaking mixture must be 30–70 weight percent, preferably 40–50 weight percent. This corresponds to an additive amount of about 100–500 ppm, preferably 200–300 ppm of carrier based on the anticaking stable equipped salt. The amount of anticaking agent added, however, can be so regulated that it amounts to 50 to 1000 ppm, preferably 100 to 1000 ppm based on the salt treated.

According to the invention it is not only important that the active components be added in suitable proportions in reference to the carrier and the equipped salt but to be added in the form of a specially produced anticaking mixture. This mixture can be produced by dry mixing the carrier in suitable proportions with the active materials in an intensive mixer and sufficient water added to this mixture that the active components go into solution and as such are drawn into the carrier material without this changing its character as a dry, free flowing powder. The amount of water is preferably 30–50%, especially 35–45% based on the total mixture of the anticaking agent. The mixing of the components suitable takes place at room temperature (i.e. about 20° C) or slightly elevated temperature. The pH value of the mixture is adjusted to y to 9, preferably 7 to 8.

Unless otherwise indicated all parts and percentages are by weight.

The following examples illustrate the process of the invention in comparison with the use of known anticaking agents.

There were carried out laboratory experiments as well as experiments on an industrial scale under the proper conditions in practice. As the anticaking equipped salts there were used several types of potassium chloride, whose chlorine content was 47.2%, equal to 99.3% KCl; the impurities included 0.2% Mg and 002% Ca. The pH value of the saturated solution was 10.5. The different types of potassium chloride differed more or less only by the different particle sizes and particle structure. The standard form of the salt contained about 17% fine portion below 400μ, while the coarse form of the salt was composed of 24% salt particles between 400 and 630 μ, 62% of particles between 630 and 1000μ and 14% of particles >1000μ. Besides there was used a KCl granulate whose particle size was practically 100% >1000μ.

EXAMPLE 1

In a first series of experiments the coarse form of KCl was treated in an intensive mixer with the following anticaking agent solutions per kg of salt.

1. 2 ml of a solution containing 10% $Na_4[Fe(CN)_6]\cdot 10\ H_2O$
2. 10 ml of a solution containing 2% $Na_4[Fe(CN)_6]\cdot 10\ H_2O + 5\%\ Na_2CO_3$
3. 10 ml of a solution containing 2% $Na_4[Fe(CN)_6]\cdot 10\ H_2O + 10\%\ Na_2CO_3$
4. 10 ml of a solution containing 2% $Na_4[Fe(CN)_6]\cdot 10\ H_2O + 20\%\ Na_2CO_3$
5. 10 ml of a solution containing 2% $Na_4[Fe(CN)_6]\cdot 10\ H_2O + 2.5\%\ EDTA\ Na_4$
6. 10 ml of a solution containing 2% $Na_4[Fe(CN)_6]\cdot 10\ H_2O + 10\%\ EDTA\ Na_4$
7. 10 ml of a solution containing 2% $Na_4[Fe(CN)_6]\cdot 10\ H_2O + 20\%\ EDTA\ Na_4$
8. 10 ml of a solution containing 2% $Na_4[Fe(CN)_6]\cdot 10\ H_2O + 5\%\ NTA\ Na_3$
9. 10 ml of a solution containing 2% $Na_4[Fe(CN)_6]\cdot 10\ H_2O + 15\%\ NTA\ Na_3$
10. 10 ml of a solution containing 2% $Na_4[Fe(CN)_6]\cdot 10\ H_2O + 2\%\ POC$, Type A
11. 10 ml of a solution containing 2% $Na_4[Fe(CN)_6]\cdot 10\ H_2O + 5\%\ POC$, Type A
12. 10 ml. of a solution containing 2% $Na_4[Fe(CN)_6]\cdot 10\ H_2O + 15\ POC$, Type A
13. 2 ml of a solution containing 10% $Ca_2[Fe(CN)_6]\cdot 11\ H_2O$
14. 2 ml of a solution containing 10% $Ca_2[Fe(CN)_6]\cdot 11\ H_2O + 3\%\ CaCl_2$ EDTA $Na_4$ is the sodium salt of ethylenediamine tetraacetic acid and NTA $Na_3$ is the sodium salt of nitrilotriacetic acid.

The samples were subsequently stored for several weeks in a changing climate at above 80% relative humidity or below 30% relative humidities and normal temperature (i.e. about 20° C) and the anticaking activity measured by the depth of penetration of a test needle and also by measuring the resistance of crushing by a punch having a 1 kg/cm² load. The results of this series of tests are set forth in Table 1 and permit the following summary:

While the non-dosaged samples after 8 weeks storage with 8 climate changes had measured a resistance to crushing of 195 kg, the best dosaged sample 2 hardened substantially less:

It had a resistance to crushing of only 27.3 kg. In a further four samples (Nos. 3, 6, 10 and 13 with different anticaking agent combinations the hardening of the salt could be lowered about 76–80%

TABLE 1

EXAMPLE 1

| | Anticaking agent - addition in ppm | | | | | Depth of penetration of test needle in cm after the following test times | | | | Crushing Resistance in kg |
|---|---|---|---|---|---|---|---|---|---|---|
| Sample No. | $Na_4Fe(CN)_6\cdot 10H_2O$ (Samples 1–12) | $Na_2CO_3$ | EDTA $Na_4$ | NTA $Na_3$ | POC Type A | 3 weeks 3 turns | 4 weeks 3 turns | 6 weeks 7 turns | 8 weeks 7 turns | after 8 weeks and 8 turns |
| 1 | 200 | — | — | — | — | 0–1 | >14 | 0 | 0 | 83.3 |
| 2 | 200 | 500 | — | — | — | >14 | 5–6 | 1–2 | 0 | 27.3 |
| 3 | 200 | 1000 | — | — | — | >14 | 6 | 1–4 | 0–1 | 45.2 |
| 4 | 200 | 2000 | — | — | — | 0–1 | — | — | — | — |
| 5 | 200 | — | 250 | — | — | >14 | 4 | 3–4 | 0 | 77.7 |
| 6 | 200 | — | 1000 | — | — | 1–2 | 1–2 | 1 | 0 | 44.7 |
| 7 | 200 | — | 2000 | — | — | 11 | 1–4 | 1 | 0 | 55.7 |
| 8 | 200 | — | — | 500 | — | 0–1 | — | — | — | — |
| 9 | 200 | — | — | 1500 | — | 0–1 | — | — | — | — |
| 10 | 200 | — | — | — | 200 | 0–1 | 7–9 | 0–1 | 0 | 46.2 |
| 11 | 200 | — | — | — | 500 | 0–1 | 0–2 | 1 | 0 | 51.7 |
| 12 | 200 | — | — | — | 1500 | 0–1 | 3–4 | 3 | 0 | 179 |
| 13 | 200 $Ca_2Fe(CN)_6\cdot 11H_2O$ | — | — | — | — | 11–14 | 9–>14 | 5 | 0 | 41 |
| 14 | 200 $Ca_2Fe(CN)_6\cdot 11H_2O$ + 60 $CaCl_2$ | — | — | — | — | 11–14 | >14 | >14 | 1–2 | 174 |
| 0 | None | — | — | — | — | 0–1 | 0–4 | 0 | 0 | 195 |

EXAMPLE 2

Based on the results of the preliminary tests (Example 1) there were carried out large scale experiments in a salt works in which for each 100 metric tons of potassium chloride there were dosed in the following anticaking additives a. 300 liters of an aqueous solution containing 20Kg $Na_4Fe(CN)_6 \cdot 10H_2O$, 49kg $Na_2CO_3$ and 1kg of POC Type A; this corresponds to a dosing of the salt with 200 ppm $Na_4Fe(CN)_6 \cdot 10H_2O$, 490 ppm $Na_2CO_3$ and 10ppm POC Type A.

b. 60 liters of an aqueous solution containing 20kg $Ca_2Fe(CN)_6 \cdot 11H_2O$; which corresponds to a dosing of the salt with 200 ppm of $Ca_2Fe(CN)_6 \cdot 11H_2O$.

c. 60 liters of a solution containing 30% $Ca_2Fe(CN)_6 \cdot 11H_2O$ and 8% $CaCl_2$; which corresponds to a dosing of the salt with 180 ppm of $Ca_2Fe(CN)_6 \cdot 11H_2O$ and 48 ppm $CaCl_2$.

The solutions were sprayed from a nozzle on the salt still wet from the centrifuge while the salt was transported to the drying plant in chain case conveyer about 40 cm wide and at a velocity of 40–60 metric tons of KCl per hour. At delivery of the ferrocyanide solution this salt still contained about 2% water. After the drying at 160° C the product was conveyed by way of a conveyer belt and a chute into a large storage hall and poured into a mountain. At the time of flowing into the silo the salt still had a temperature of above 70° C. and only cooled slowly during the storage.

For control and quality checking of the anticaking equipment of the salt, samples were drawn off from the storage hall at intervals of about 15 minutes and the ferrocyanide content checked by a Berlin blue reaction. The analyses showed that the ferrocyanide did not change during the drying process and a good distribution on the salt was produced.

After 3 months storage the salt mountain was cut into tangentially with a shovel dredger and half carried away. This showed that the salt during the long storage indeed was not caked solid, but still hung together so strongly that steep walls of the salt mountain remained. Thus this dosing of the salt only leads to a partial improvement of the anticaking condition.

EXAMPLE 3

In a further series of experiments, the KCl-standard article was dosed in a rotating tube at 120° C with the anticaking agent combinations given in Table 2. The addition of the materials in part took place in the form of aqueous solutions, another part as solid mixtures or individual components. These test conditions correspond to a dosing of the salt in practice if it is conveyed to the silo after the drying and classifying with conveyer belts, screw conveyers and other transportation apparatus.

TABLE 2
EXAMPLE 3

| Sample No. | Anticaking agent - addition in ppm | Depth of penetration of test needle in cm after the following test times | | | | Crushing Resistance in kg after 5 weeks and 10 changes |
|---|---|---|---|---|---|---|
| | | 2 weeks 4 changes | 3 weeks 6 changes | 4 weeks 8 changes | 5 weeks 10 changes | |
| 15 | 200 $Ca_2Fe(CN)_6 \cdot 11H_2O$ + 100 Glycerine | 0 | 0 | 0 | 0 | >250 |
| 27 | 50 $Ca_2Fe(CN)_6 \cdot 11H_2O$ + 250 polyethylene-Glycol (mol.wt.400) | 1–3 | 1 | 0 | 0 | ~10 |
| 33 | 50 $Na_4Fe(CN)_6 \cdot 10H_2O$ + 250 polyethylene-Glycol 400 | 2–3 | 1–2 | 1 | 0 | ~9 |
| 44 | 500 K (wet precipitated silica) | 0 | 0 | 0 | 0 | >150 |
| 45 | 250 K (wet precipitated silica) | 0 | 0 | 0 | 0 | ~100 |
| 48 | 65 $Na_4Fe(CN)_6 \cdot 10H_2O$ + 250 K | 2–3 | 1–2 | 1 | 0 | ~8 |
| 52 | 65 $Ca_2Fe(CN)_6 \cdot 11H_2O$ + 20 $CaCl_2$ + 250 K | 1–2 | 1 | 0 | 0 | ~70 |
| 34 | 100 $Ca_2Fe(CN)_6 \cdot 11H_2O$ + 180 $Na_2CO_3$ − 250 K | 1–2 | 1 | 1 | 0 | ~12 |
| 38 | 100 $Na_4Fe(CN)_6 \cdot 11H_2O$ + 180 $Na_2CO_3$ − 50 K | 0 | 0 | 0 | 0 | >150 |
| 68 | 100 $Na_4Fe(CN)_6 \cdot 10H_2O$ + 50 Stearic acid | 0 | 0 | 0 | 0 | ~90 |
| 63 | 65 $Na_4Fe(CN)_6 \cdot 10H_2O$ + 250 K + 500 Stearic acid (St.A.) | 2–3 | 3–4 | 2–4 | 2–4 | <1 |
| 64 | 130 $Na_4Fe(CN)_6 \cdot 10H_2O$ + 500 K + 50 St.A. | 5–7 | 3–4 | 2–4 | 3–4 | <1 |
| 65 | 130 $Na_4Fe(CN)_6 \cdot 10H_2O$ + 500 K + 10 St.A. | 7–9 | 4 | 3–4 | 3–4 | ~1 |
| 66 | 65 $Na_4Fe(CN)_6 \cdot 10H_2O$ + 250 K + 50 St.A. | 6–8 | 6 | 5–7 | 5–6 | <<1 |
| 67 | 65 $Na_4Fe(CN)_6 \cdot 10H_2O$ + 250 K + 5 St.A. | 5–8 | 4 | 5–6 | 5 | ~1 |
| 73 | 100 $Na_4Fe(CN)_6 \cdot 10H_2O$ + 100 D(hydrophobic silica) | 5–6 | 2–3 | 3 | 1–3 | ~3 |
| 71 | 100 $Na_4Fe(CN)_6 \cdot 10H_2O$ + 50 St.A. + 7.5 D | 5–7 | 4–6 | 3–5 | 4–5 | ~1 |
| 77 | 30 n-Propyltrimethoxysilane | 5 | 2 | 3 | 2–4 | ~3 |
| 79 | 200 n-Propyltrimethoxysilane | 5 | 0 | 1 | 1–2 | ~12 |
| 82 | 200 $K_4Fe(CN)_6 \cdot 3H_2O$ + 50 n-Propyltrimethoxysilane | 10 | 3–4 | 1–3 | 1–3 | ~2 |
| 87 | 200 $K_4Fe(CN)_6 \cdot 3H_2O$ + 200 ES-Wax-Emuls. | 7 | 4 | 3–5 | 3–4 | ~9 |
| 90 | 200 $Ca_2Fe(CN)_6 \cdot 11H_2O$ + 200 Es-Wax-Emuls. | 6 | 3 | 3–4 | 2–3 | ~15 |
| 91 | 200 POC, Type B | 7–9 | 8 | 7–8 | 6–8 | <1 |
| 92 | 100 POC, Type B | 7 | 7 | 7–9 | 7 | <1 |

For testing of the anticaking activity of the additives the samples were again stored in a changing claim at over 80% relative humidity or below 30% relative humidity and normal temperature for several weeks and at several time intervals the penetration pressure of a test needle and the crushing resistance measured with a punch having a 1kg/cm² load. The results of this series of tests are likewise collected in Table 2 and permit the following interpretation.

The combination of ferrocyanides and hydrophilizing products such as glycerin or polyethylene glycol (Samples Nos. 15, 27 and 33) only causes a partial reduction of the degree of hardening of the salt. The polyethylene glycol used had a molecular weight of about 400. The addition of the substances took place in the form of an aqueous solution in an amount of 2ml/kg of salt. After 5 weeks storage of the salt samples and 10 climate changes the salt was so strongly clumped together that the test needle loaded with 200 grams could not penetrate any centimeter more into the salt.

In a further series of experiments a wet precipitated silica designated as K (88% $SiO_2$, 0.3% $Al_2O_3$, 0.5% $SO_3$, 0.6% $Na_2O$, 6% adsorbed moisture, 5.7 SiOH/100 A², BET surface area 230m²/g) in addition amounts of 50–500 ppm was tested alone and in combination with other compounds. The samples 44 and 45 show that by adding only K there can be produced neither an improvement in the degree of hardening nor the desired flowability of the salt. Also combinations with different ferrocyanides, calcium chloride and sodium carbonate brought about only certain gradual improvements (Samples Nos. 48, 52, 34). However, if there are simultaneously added a certain amount of stearic acid there is produced a clearly improved anticaking result (Samples Nos. 68, 63, 64, 65, 66, 67). Also in combination with the hydrophobe silica D (92% $SiO_2$, 0.1% $Al_2O_3$, 3% C in the form of methyl groups, 0.2% $SO_3$, 3% adsorbed moisture, BET surface area 110m$^2$/g, average primary particle size 18μm) the anticaking activity of the ferrocyanide is substantially increased (Sample Nos. 73, 71).

Hydrophobizing agents such as n-propyltrimethoxysilane, which are added in aqueous alcoholic solutions effect either alone or in combination with ferrocyanide only a gradual improvement (Sample Nos. 77, 79, 82). Comparable results are obtained if in place of the n-propyltrimethoxysilane there is added an aqueous emulsion of ES-wax in combination with ferrocyanides (Sample Nos. 87, 90).

A very good anticaking action was produced in this series of experiments also with POC, Type B when it was added in the form of an aqueous solution (10ml/kg of salt) in amounts of 100 or 200 ppm based on the hot salt.

EXAMPLE 4

In a further large scale experiment in the salt works the following anticaking agents were added for dosing in each case 100 metric tons of potassium chloride.

(a) A solution of 120 grams/l of $Na_4Fe(CN)_6 \cdot 10H_2O$ + 120 grams/l of $Na_2CO_3$ + 2.5 grams/l of POC, Type B. Each time there were added 1.7 liters of this solution per ton of potassium chloride. This corresponds to a dosing with about 200 ppm sodium ferrocyanide, 200 ppm $Na_2CO_3$ and 4 ppm POC Type B.

b. A solution of 29.1% $Ca_2Fe(CN)_6 \cdot 11H_2O$ +8% $CaCl_2$. The amount of solution added was 0.8 liter per ton of KCl and corresponds to a dosing with about 230 ppm $Ca_2Fe(CN)_6 \cdot 11H_2O$ and 85 ppm $CaCl_2$.

C. A solid mixture consisting of 41% K (wet precipitated silica), 10% $Na_4Fe(CN)_6 \cdot 10H_2O$, 8% stearic acid and 41% water. There was added about 600 grams of this mixture per ton of KCl. This corresponds to a dosing with about 250 ppm K, 65 ppm sodium ferrocyanide and 50 ppm stearic acid.

d. A 20% solution of POC, Type B. This solution was added in amounts of 1 liter per ton of KCl; this corresponds to a dosing with about 200 pm POC, Type B.

The anticaking agents were added in this experiment to the dry but still at about 120° C hot salt while it ran from a chute onto a conveyer belt. A pumping apparatus with an automatic performance indicator and a unary nozzle which permitted a homogenous spraying of the salt stream were inserted for dosing the solution. The solid mixture was added by a dosing trough to the potassium chloride.

The salt dosed with the various anticaking agents were subsequently conveyed into a silo and stored in four separate salt mountains. During the charging into the silo at time intervals of about 10 minutes samples were drawn and it was established through analysis that a good distribution of the anticaking agent could be produced also in this manner. After about 3 months of storage the anticaking behavior of the four salt mountains was again tested by tangentially cutting into the salt mountain with a tractor shovel.

After the interval the best results were produced with anticaking mixture (c). The salt mountain was only coated with an easily crushable covering layer. In the experiment, in order to climb the mountain one sank knee deep into the salt. Because of the continuously dropping salt it was not possible to come to the peak of the mountain. In the tangential removing of the tapered salt mountain the salt dropped immediately and again formed a shallow angle of repose. This result corresponds to the ideas of the salt industry.

An equally good result was produced with anticaking agent (d). This salt mountain was also coated only with a thin cover layer, which, however, was somewhat stronger than in the experiment with mixture (c) and permitted the salt mountain to be walked through with trouble. In removing of the mountain the salt likewise dropped. However, it built a steeper sloping angle than with sample (c).

The salt mountains closed with anticaking mixtures (a) and (b) were less well cut away. The salt mountains were both coated by a harder covering layer which also held together somewhat more strongly so that in the removing of the mountain relatively steep walls remained. In comparison to the non dosed salt there was established to be sure, a certain improvement in the degree of hardening, however the effect was insufficient.

EXAMPLE 5

In a further large scale experiment in the salt works the production mixture of KCl standard article and coarse articles were dosed with the following anticaking additives in powder form.

a. 65 ppm $K_4Fe(CN)_6 \cdot 3H_2O$, 250 ppm K (wet precipitated silica), 50 ppm of staric acid, 0.1 ppm milori blue and 250 ppm water.

b. 65 ppm $K_4Fe(CN)_6 \cdot 3H_2O$, 250 ppm K, 50 ppm POC Type B, 0.1 ppm milori blue and 250 ppm water.

c. 65 ppm $Na_4Fe(CN)_6 \cdot 10H_2O$, 250 ppm K, 25 ppm POC (Type B), 25 ppm stearic acid and 250 ppm water.

The addition of the anticaking additives took place in the form of homogeneous anticaking agent mixtures which produced the following results.

Mixture (a): There were mixed for 5 minutes in an intensive mixer with a usable volume of 150 liters 25.0 kg of K (wet precipitated silica), 6.5 kg of $K_4Fe(CN)_6 \cdot 3H_2O$ in powder form, 10 grams of Milori blue and 5.0 kg of powdery stearic acid and then inside another 5 minutes there were added 25 liters of water and mixing continued for a further 10 minutes. There were obtained thereby 61.5 kg of a powdery readily flowable anticaking agent with a bulk density (apparent density) of about 600 grams/l, which is storage stable and not clumped together.

Mixture (b): There were present in an intensive mixer with a usable volume of 150 liters 25.0 kg of k and there were added to the running mixer within 5 minutes a solution of 6.5 kg of $K_4Fe(CN)_6 \cdot 3H_2O$, 10 grams of Milori blue and 5.0 kg of POC (Type B) in 25 liters of water. The mixing was continued for a further 10 minutes and the powdery, easily dosable anticaking agent discharged.

Mixture (c): There were present in an intensive mixer with a usable volume of 150 liters 25.0 kg of K and 2.5 kg of powdery stearic acid and there were added to the running mixer in 5 portions within 5 minutes a solution of 6.5 kg of $Na_4Fe(CN)_6 \cdot 10h_2O$ and 2.5 kg. of POC Type B in 25 liters of water. Then thorough mixing was contained for 10 minutes and the powdery, readily flowable anticaking agent discharged.

The dosing of the anticaking agent again took place using a dosing trough on the dry, hot salt. After addition of the anticaking agent the salt was also mixed on the conveyer belt by a plowshare system. To compensate for the yellow tinge of the salt there were simultaneously dropped on the wet salt pump before the drying tube, a calcium ferrocyanide solution. The amount added was about 10 ppm of $Ca_2Fe(CN)_6 \cdot 11H_2O$.

Separate 100 ton lots of potassium chloride were dosed with each of the three anticaking agents just mentioned and stored separately in the silo. After 4 weeks of storage the salt mountain was tested for flowability by culling in with a tractor shovel. In all three mountains subsequently slid homogeneously and always formed again a smooth debris cone. In this experiment there also could not be established a formation of a crust on the surface of the salt mountain, although the climatic conditions changed drastically during the storage time and periods with very high air humidity were produced. In the half excavated of a fourth salt mountain without additive on the contrary there remained steep walls. The salt dosed with the anticaking agents differed from the non dosed salt at the same time by a white appearance. This result suits the desires of the salt industry.

The composition can comprise, consist essentially of or consist of the stated materials and the process can comprise, consist essentially of or consist of the steps set forth.

What is claimed is:

1. A flowable alkali metal chloride composition resistant to caking on storage including as an anticaking agent (A) in complex iron cyanide (B) a water insoluble, inorganic, inert, finely divided hydroxyl group containing carrier material, optionally (C) and including (D) where (C) is a hydrophobizing material and (D) is
    1. is a polyacrylate (2) poly-(alpha-hydroxyacrylate), (3) maleic acid homo or copolymer, (4) itaconic acid homo or copolymer or (5) a salt of (1), (2), (3) or (4), said materials (A), (C) and (D) being present on B, said anticaking agent providing a permanent moisture content of at least 0.01 weight % of water on the salt.

2. A flowable alkali metal chloride composition resistant to caking on storage including as an anticaking agent (A) a complex iron cyanide (B) a water insoluble, inorganic, inert, finely divided hydroxyl group containing carrier material, optionally (C) and including (D) where (C) is a hydrophobizing material and (D) is a polycarboxylate containing a predominant amount of carboxylic acid or carboxylate groups and also containing carbonyl groups, hydroxyl groups or a mixture of carbonyl and hydroxyl groups and which polycarboxylate has an average degree of polymerization between 5 and 500, said materials (A), (C) and (D) being present on B, said anticaking agent providing a permanent moisture content of at least 0.01 weight % of water on the salt.

3. A composition according to claim 2 where (D) is a poly (aldehydocarboxylic acid) prepared by oxidizing a copolymer of acrylic acid and acrolein.

4. A composition according to claim 2 wherein (D) is a polymer composited predominantly of two repeating units having the formulae:

and

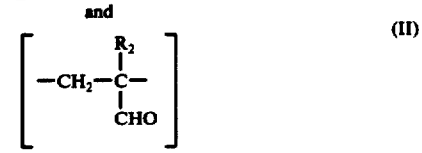

or units having the formula I and II together with minor amounts of repeating units having the formula:

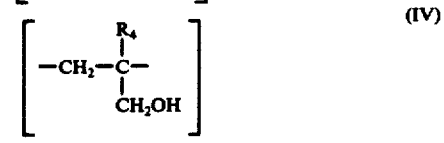

or

where A is hydrogen, alkali metal or the ammonium ion, R is hydrogen, methyl, hydroxymethyl, ethyl, chlorine or bromine, $R_2$ is hydrogen or hydroxymethyl, $R_4$ is hydrogen or hydroxymethyl, $R_3$ is hydrogen methyl or ethyl and $R_5$ is hydrogen, methyl or ethyl.

5. A composition according to claim 4 wherein (D) is present in an amount of 0.005 to 0.03 weight % base on the alkali metal chloride.

6. A flowable alkali metal chloride composition resistant to caking on storage including as an anticaking agent (A) sodium, potassium or calcium ferrocyanide (B) a water insoluble, inorganic, inert finely divided hydroxyl group containing carrier material, optionally (C) and including (D) where C is a hydrophobizing material and (D) is the sodium salt of a polycarboxylate having carbonyl groups, hydroxyl groups, or both carbonyl and hydroxyl groups and (D) is present in an amount of 0.001 to 0.1 weight % based on alkali metal chloride, said materials (A) (C) and (D) being present on B, said anticaking agent providing a permanent moisture content of at least 0.01 weight % of water on the salt.

7. A flowable composition according to claim 6 wherein (D) is 0.005 to 0.03 weight % based on the alkali metal chloride.

* * * * *

UNITED STATES PATENT OFFICE
CERTIFICATE OF CORRECTION

Patent No. 4,051,228        Dated Sept. 27, 1977

Inventor(s) Helmut KNORRE, Joachim FISCHER and Gerhard POHL

It is certified that error appears in the above-identified patent and that said Letters Patent are hereby corrected as shown below:

[73] Assignee: Deutsch Gold- und Silber-Scheideanstalt vormals Roessler, Frankfurt, Germany Signed and Sealed this Seventeenth Day of January 1978

[SEAL]

Attest:

RUTH C. MASON
*Attesting Officer*

LUTRELLE F. PARKER
*Acting Commissioner of Patents and Trademarks*